United States Patent
Thankachan et al.

(10) Patent No.: US 11,645,105 B1
(45) Date of Patent: May 9, 2023

(54) AUTOSCALING DATA PLANE

(71) Applicants: Aby Thankachan, Sammamish, WA (US); Lorenzo David, San Francisco, CA (US)

(72) Inventors: Aby Thankachan, Sammamish, WA (US); Lorenzo David, San Francisco, CA (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 17/809,653

(22) Filed: Jun. 29, 2022

(51) Int. Cl.
*G06F 9/455* (2018.01)
*G06F 9/54* (2006.01)
*G06F 9/50* (2006.01)

(52) U.S. Cl.
CPC ........ *G06F 9/45558* (2013.01); *G06F 9/5077* (2013.01); *G06F 9/546* (2013.01); *G06F 2009/45562* (2013.01)

(58) Field of Classification Search
CPC .... G06F 9/45558; G06F 9/5077; G06F 9/546; G06F 2009/45562
See application file for complete search history.

(56) References Cited

U.S. PATENT DOCUMENTS

| | | | |
|---|---|---|---|
| 10,404,613 B1* | 9/2019 | Brooker | H04L 47/70 |
| 2016/0205518 A1* | 7/2016 | Patel | H04W 4/08 455/518 |
| 2020/0007405 A1* | 1/2020 | Chitalia | G06F 9/5072 |
| 2020/0356397 A1* | 11/2020 | Kumatagi | H04L 45/02 |
| 2021/0019194 A1* | 1/2021 | Bahl | G06F 9/3877 |

* cited by examiner

*Primary Examiner* — Kenneth Tang
(74) *Attorney, Agent, or Firm* — Schwegman Lundberg & Woessner P.A.

(57) ABSTRACT

A method of adjusting a number of virtual machines in a data plane is provided. A number of virtual machines in the data plane each having a data plane proxy is provisioned. The virtual machines provide data routing for a first number of operational pods in a deployment plane associated with the data plane. A status of the deployment plane is monitored. The status reflects the deployment plane has a second number of operational pods different from the first number of operational pods. The first number of operational pods is compared to the second number of operational pods. Based on the comparison, the number of virtual machines in the data plane is adjusted.

14 Claims, 6 Drawing Sheets

AUTOSCALING DATA PLANE

TECHNICAL FIELD

Examples relate generally to distributed computing environments and, more particularly, but not by way of limitation, to provisioning data plane proxies for a deployment plane based on changing data throughput requirements associated with a deployment plane.

BACKGROUND

Cloud-computing systems have grown in popularity as a method of providing computer implemented resources. A service provider can provide services to various end-users based on the needs of the various end-users. In order to ensure that traffic is properly routed to each end-user of the various end-users, virtual machines that run data plane proxies are used.

Typically, an end user requests a resource from the service provider and virtual machines residing at a data plane are assigned to assist with routing. To further illustrate, the end user can be using an application instance such as Apache Kafka™, Kafka™ structured query language (KSQL), SchemaRegistry, Connect, or the like, where the application service is implemented at pods at a deployment plane. At the data plane, the virtual machines are provisioned based on the number of pods that will be implementing the application service. The virtual machines can be used to assist with routing traffic for the various pods at the deployment plane. Often, the number of virtual machines assigned to the various pods is fixed at the time of deployment.

BRIEF DESCRIPTION OF THE DRAWINGS

Various ones of the appended drawings merely illustrate example examples of the present disclosure and should not be considered as limiting its scope.

DETAILED DESCRIPTION

Figure 1:
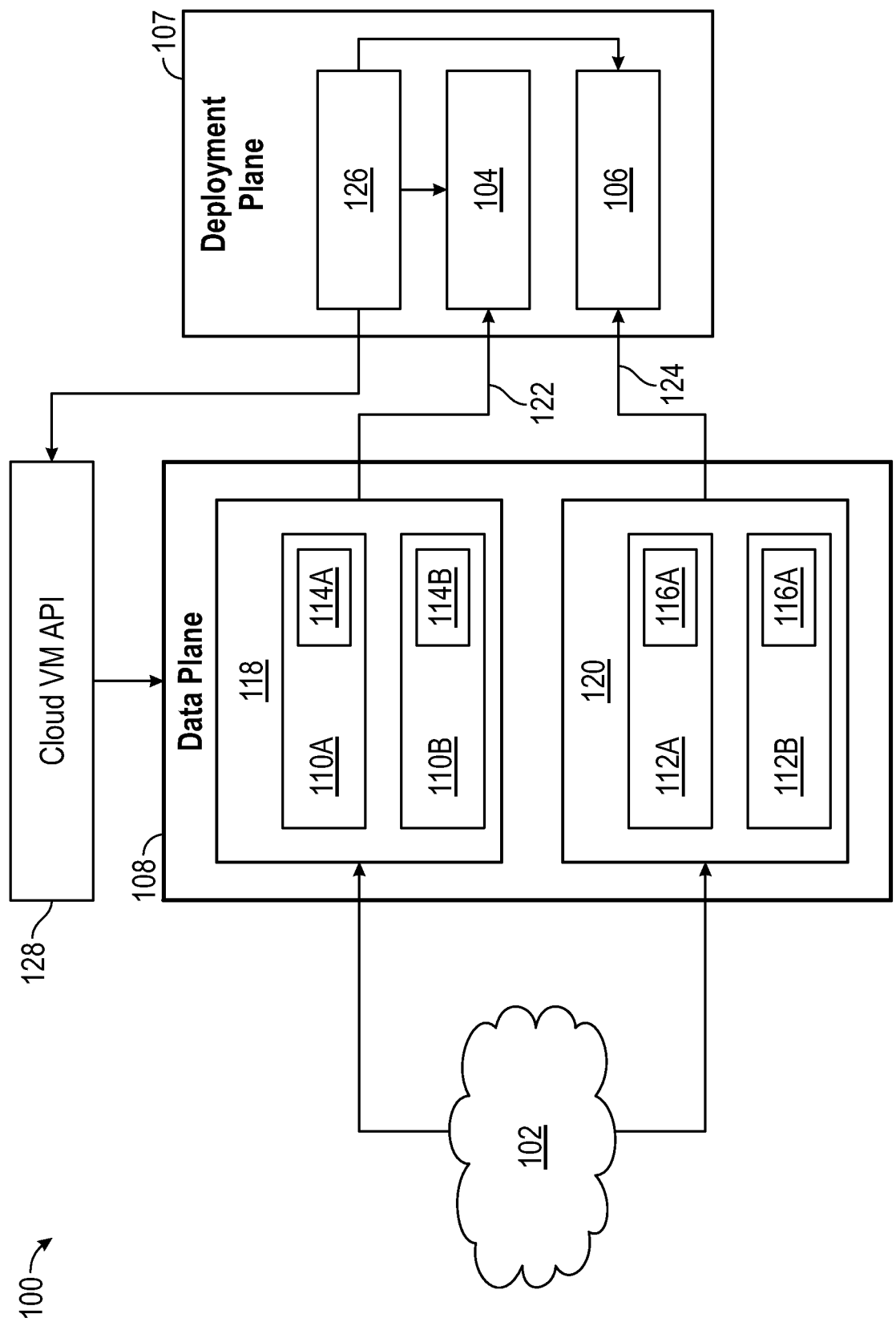
FIG. 1 illustrates a computing environment having a data plane associated with a deployment plane, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

As mentioned above, a number of virtual machines assigned to the various pods is fixed at the time of deployment. However, instances may occur where the needs of the end user change after the virtual machines have been provisioned. To further illustrate, an end user may require fewer pods at the deployment plane to meet their needs or may require more pods at the deployment plane to meet their needs. Nonetheless, the number of virtual machines assigned at the data plane is fixed. Thus, if the end user implements fewer pods after the virtual machines have been provisioned, over-provisioning can occur where too many virtual machines are assigned for the deployment plane having the pods. If the needs of the user increase after provisioning and the end user implements more pods, under-provisioning can occur where not enough virtual machines are assigned for the deployment plane having the pods.

In further instances, a deployment plane can be assigned to a data plane prior to a service provider receiving a request. Here, based on historical data associated with the deployment plane, a fixed number of virtual machines are assigned to the deployment plane. To further illustrate, a deployment plane can traditionally have a throughput requirement of 10 gigabits per second (Gbps), which requires two virtual machines that can support of throughout of 5 Gbps each in the data plane associated with the deployment plane. Thus, regardless of the requirements of the end user, i.e., the end user may only require a throughput of 50 megabits per second (Mbps), two virtual machines will be assigned to the deployment plane. Again, this can cause over-provisioning. Moreover, if the end user has a throughput requirement of 20 Gbps that would typically require four virtual machines, since the data plane assigned to the deployment plane associated with the pods of the end user only has two virtual machines, under provisioning will occur.

Accordingly, what is needed is a method to scale a data plane as the needs of an end user change after deployment of data plane proxies.

Examples relate to systems and methods for dynamically adjusting a number of virtual machines in a data plane that route traffic for pods in a deployment plane. Initially, a first number of virtual machines can be provisioned for a deployment plane based on a first number of operational pods implemented at the deployment plane. The number of operational pods at the deployment plane can change based on the needs of an end user implementing the pods. Thus, in examples, after provisioning, a status of the deployment plane is monitored. In some examples, the status can be monitored during a first time period. The status can relate to the number of pods that are actually operational at the deployment plane. Accordingly, a status of the deployment plane can reveal that a second number of pods, which can be different from the first number of pods, is operational at the deployment plane.

The first number of operational pods at the deployment plane is compared to the second number of operational pods at the deployment plane. In examples, the first number of operational pods can relate to the number of pods the end user originally indicated would be needed. Furthermore, in some examples, the first number of pods can be the number of pods that was used in determining a number of virtual machines to initially provision. Based on the comparison, the number of virtual machines operating at the data plane is adjusted. Throughout this document, reference will be made to dynamically changing a number of virtual machines. As mentioned above, virtual machines are at the data plane. Thus, in examples, dynamically changing a number of virtual machines can also relate to dynamically changing a data plane since the virtual machines are at the data plane and the data plane changes by virtue of the number of active virtual machines changing.

In examples, the second number of operational pods can be less than the first number of operational pods. Thus, the number of virtual machines in the data plane can be dynamically reduced after the initial provisioning. In further examples, the second number of operational pods can be greater than the first number of operational pods. Thus, the number of virtual machines in the data plane can be dynamically increased after the initial provisioning.

In further examples, after the number of virtual machines are adjusted after the first time period, monitoring of the status of the deployment plane continues during a second time period. The status can reveal that a third number of pods, which can be different from the second number of pods, is operational at the deployment plane. The second number of operational pods at the deployment plane is compared to the third number of operational pods at the deployment plane. Based on the comparison, the number of virtual machines operating in the data plane is adjusted.

Examples improve the functioning of computing devices. As will be discussed below, examples determine if the computing requirements of a number of computing devices, such as pods, exceed the ability of another computing device, such as machine corresponding to a virtual machine, to provide those computing requirements. As will be detailed below, pods may have certain bandwidth requirements to properly execute application instances operating thereon. Examples ensure that enough computing resources, by way of virtual machines implementing physical computing devices, are provided to the pods to allow for proper functionality of the pods. Thus, without the examples set forth herein, the computing pods may not be able function properly, thereby improving the functioning of computing devices, such as the aforementioned pods.

Now making reference to the Figures and more specifically FIG. 1, a computing environment 100 is shown in which examples can operate. The computing environment 100 can include a virtual private cloud 102 from which data can be provided to clusters 104 and 106 in a deployment plane 107. Examples of the virtual private cloud 102 can include Amazon Web Services™ (AWS™), IBM Cloud™, Google Cloud Platform, Microsoft Azure, and the like.

In examples, a data plane 108 facilitates the routing of data from the virtual private cloud 102 to each of the clusters 104 and 106. The data plane 108 can employ virtual machines 110A, 110B, 112A, and 112B (referred to herein as virtual machines 110 and 112) having data plane proxies 114A, 114B, 116A, and 116B (referred to herein as data plane proxies 114 and 116). The data plane proxies 114 and 116 can mediate and control network communication between the virtual private cloud 102 and the clusters 104 and 106. The data plane proxies 114 and 116 can run on the virtual machines 110 and 112. The virtual machines 110 and 112 can be based on computer architectures and provide functionality associated with physical computers. Thus, in examples, the virtual machines 110 and 112 can correspond to physical computers such that the data plane can also correspond to physical computers in the context of improving performance of a computing device.

The virtual machines 110A and 110B can be associated with an availability zone 118. Moreover, the virtual machines 112A and 112B can be associated with an availability zone 120. The availability zones 118 and 120 can correspond to virtual machines, such as the virtual machines 110 and 112, that are available to assist with data routing to clusters, such as routing data from the virtual private cloud 102 to the clusters 104 and 106. In examples, the availability zones 118 and 120 and the associated virtual machines 110 and 112 are initially provisioned to the clusters 104 and 106. Thus, in instances where the virtual machines 110A and 110B are provisioned to the cluster 104 as noted at 122, the virtual machines 110A and 110B can route traffic corresponding to data from the virtual private cloud 102 to the cluster 104. The virtual machines 110A and 110B can ensure that the traffic arrives at the proper destination, such as pods associated with the cluster 104. In some instances, pods associated with the cluster 104 can be stateful devices. Thus, if incorrect data is routed to the pods associated with the cluster 104, the pods are unable to process the data. The routing can be based on server name indication information (SNI) extracted from the connection setup packets used during the setup of communication links with the virtual private cloud 102. Similarly, in instances where the virtual machines 112A and 112B are provisioned to the cluster 106 as noted at 124, the virtual machines 112A and 112B can route traffic corresponding to data from the virtual private cloud 102 to the cluster 106. In some instances, similar to the cluster 104, pods associated with the cluster 106 can be stateful devices. Thus, if incorrect data is routed to the pods associated with the cluster 106, the pods are unable to process the data. The routing can be based on SNI extracted from the connection setup packets used during the setup of communication links with the virtual private cloud 102.

While only two clusters 104 and 106 are shown in FIG. 1, examples envision any number of clusters, where any number of available data planes having any number of virtual machines can be provisioned to the clusters. Regarding the clusters 104 and 106, as shown with reference to FIG. 2, the clusters 104/106 can include stateful sets 200 and 202. In an example, the stateful set 200 can be associated with pods 204A-204D and the stateful set 202 can be associated with pods 206A-206D. The stateful sets 200 and 202 can manage and maintain the respective pods 204A-204D and 206A-206D. The pods 204A-204D and 206A-206D can be a group of one or more containers that can share storage resources along with network resources. The pods 204A-204D and 206A-206D can be any type of computing device, as described herein. Each of the pods 204A-204D and 206A-206D can include several components. To further illustrate, each of the pods 204A-204D and 206A-206D can include an ordinal, stable storage, and a stable network identity. Moreover, each of the pods 204A-204D and 206A-206D can represent an application instance that can run an application within the physical clusters 104/106. Examples of an application instance that each of the pods 204A-204D and 206A-206D can run can include Apache Kafka™, Kafka™ structured query language (KSQL), SchemaRegistry, Connect, or the like. In examples, each of the pods 204A-204D and 206A-206D can have their own lifecycle and one of the following states: WAITING, RUNNING, OR TERMINATED. Moreover, when all the pods 204A-204D are in a RUN state, the stateful set 200 is fully available. Similarly, when all the pods 206A-206D are in a RUN state, the stateful set 202 is fully available.

Each of the stateful sets 200 and 202 can add labels to each of the pods 204A-204D and 206A-206D associated with the stateful sets 200 and 202. In examples, the labels can enable a user associated with the stateful sets 200 and 202 to attach a service to each of the pods 204A-204D and 206A-206D. Each of the stateful sets 200 and 202 can include an ordinal index that assigns the ordinals assigned to the pods 204A-204D and 206A-206D. Furthermore, the stateful sets 200 and 202 can include hostnames, headless services, a domain, and a DNS subdomain associated with the stable network identities of the pods 204A-204D and 206A-206D. In examples, the clusters 104/106 can implement Kubernetes object resource types to support an incremental change notification feed, such as a watch Application Programming Interface (API).

Returning attention to FIG. 1 and the computing environment 100, a traffic controller 126 can reside in the deployment plane 107. It should be noted that in some examples, the traffic controller 126 can also reside in the data plane 108. The traffic controller 126 can be in communication with each of the clusters 104 and 106. The traffic controller 126 can also be in communication with a cloud virtual machine API 128. The traffic controller 126 can monitor the operational state of pods in the deployment plane 107 and issue API commands regarding adjusting a number of virtual machines 110 and 112 provisioned for the deployment plane 107 based on the operational state of pods in the deployment plane 107. In examples, the traffic controller 126 can be a Kubernetes controller that monitors a status of the clusters 104 and 106. Kubernetes is a container management system that allows for the deployment of web applications, batch jobs, and databases via a unified API. The traffic controller 126 can listen for changes at the clusters 104 and 106. Examples of changes at one of the clusters 104 and 106 can include the addition or the removal of any of the pods 204A-204D and 206A-206D associated with one of the clusters 104 and 106.

Moreover, the traffic controller 126 can determine an expected traffic load. The traffic controller 126 can determine a traffic load as a function of a number of pods apportioned for a service and a service type according to the following Equation:

$$T = \text{sum}(N*S) \quad (1)$$

Where T can correspond to the traffic load requirement or traffic capacity requirement. In addition, N can correspond to the number of pods for a service. For example, if a cluster is utilizing Apache Kafka™, the cluster can have four pods that are using Apache Kafka™, where, in this example, N can correspond to four. S can correspond to the type of service being utilized by the pods. Different types of service can have different bandwidth requirements. To further illustrate, Apache Kafka™ can have high traffic loads, which requires more network bandwidth. Thus, each pod utilizing Apache Kafka™ can have higher network bandwidth demands, where a virtual machine may have to devote more resources to a single pod based on the high network band demands. Accordingly, when pods utilize Apache Kafka™, since each pod has higher network demands, a virtual machine may be provisioned to three pods due to the higher network bandwidth demands.

However, other services may be more computationally intensive and require less bandwidth. To further illustrate, KSQL has high computational requirements and requires less traffic. Therefore, each pod utilizing KSQL can have lower network bandwidth demands, where a virtual machine may have to devote fewer resources to a single pod based on the lower network bandwidth demands. Here, a virtual machine may be provisioned to ten pods due to the lower network bandwidth demands in contrast to Apache Kafka™, where the same virtual machine may only be able to support three pods when those pods utilize Apache Kafka™.

In examples, when the traffic controller 126 calculates that the change in traffic load will change a virtual machine requirement for the cluster having pods that have either been added or removed, the traffic controller 126 can issue an instruction via the cloud virtual machines API 128. The traffic controller 126 can issue the instructions based on a status of the clusters 104 and 106 and the calculated expected traffic load. The instructions issued by the traffic controller 126 can dynamically adjust a number of virtual machines, such as the virtual machines 110 and 112, that are provisioned to the clusters 104 and 106. An example of a method of adjusting a number of virtual machines in a data plane that route traffic for pods in a deployment plane is shown with reference to FIGS. 3A and 3B.

Figure 3A:
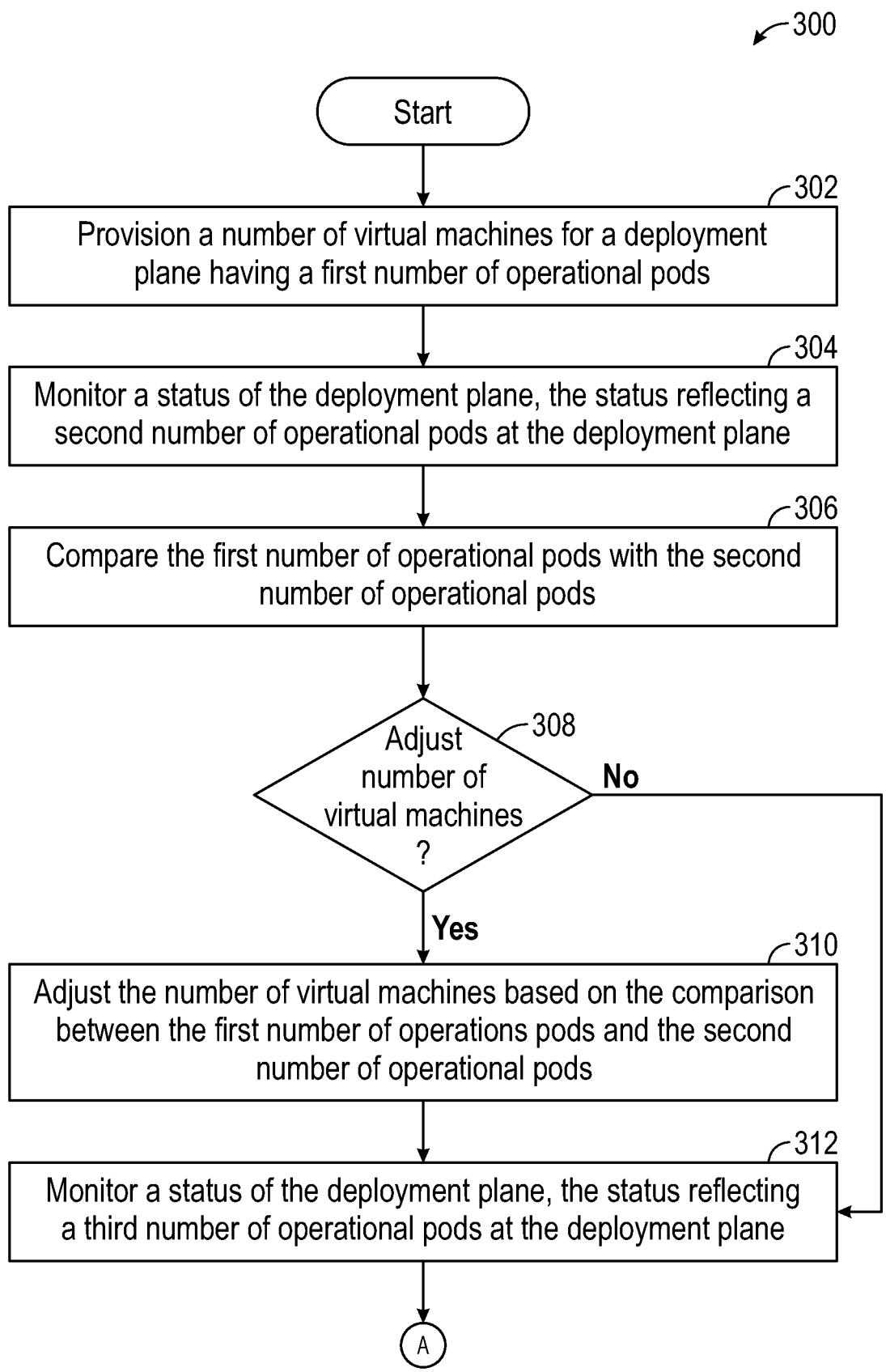
FIGS. 3A and 3B illustrates a method for dynamically scaling a data plane, according to some examples.
Figure 3B:
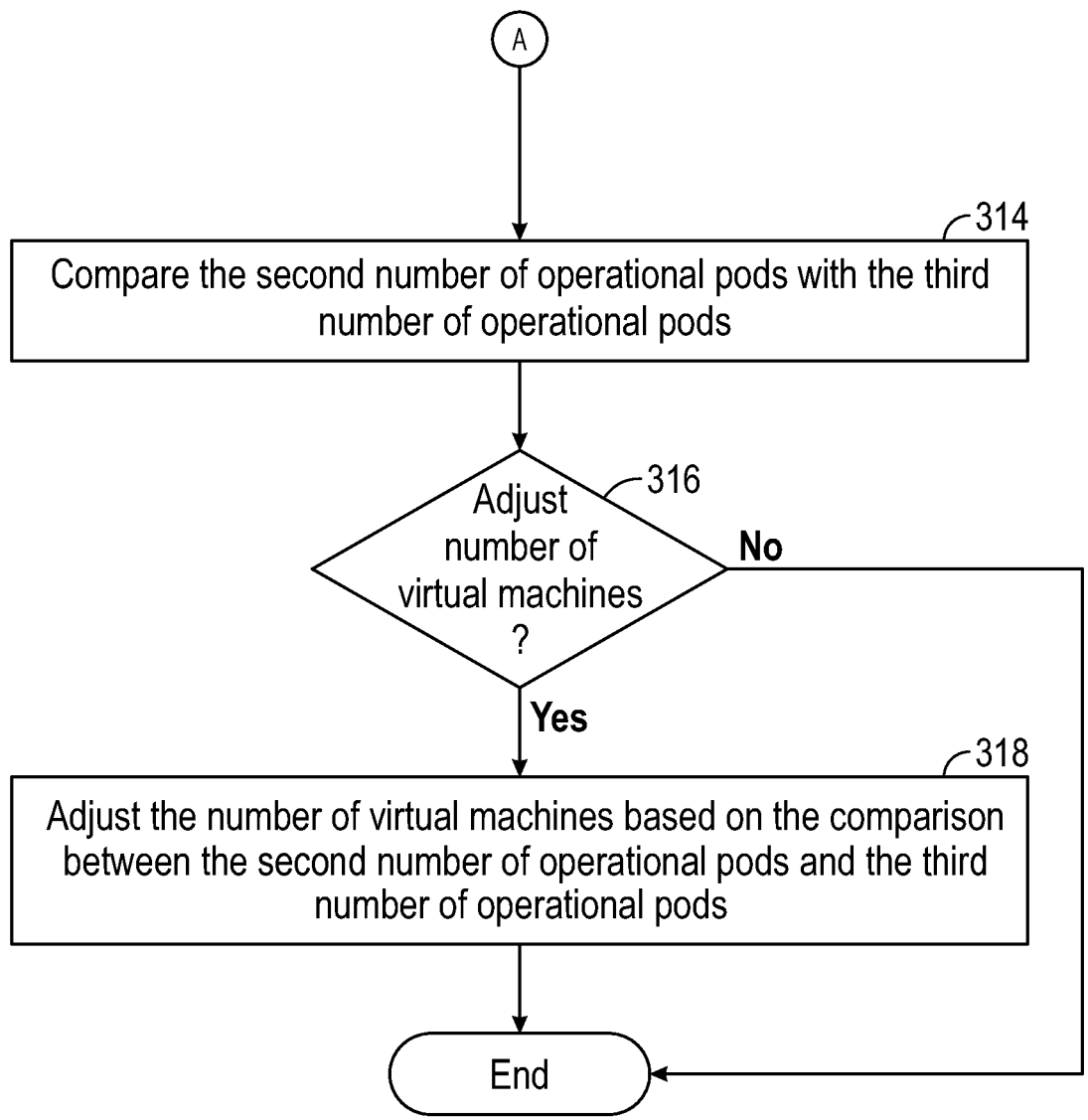

Now making reference to FIG. 3A and a method 300, initially, a number of virtual machines are provisioned for a deployment plane having a first number of operational pods in an operation 302. As discussed above, virtual machines can route traffic corresponding to data from a source, such as the virtual private cloud 102, to an endpoint, such as the cluster 104. The routing can be based on SM extracted from the connection setup packets used during the setup of communication links with the virtual private cloud 102. During the operation 302, a type of service to be utilized by pods of a cluster is determined. As used herein, the term "operational pod" or "operational pods" can refer to a pod, or pods, such as the pods 204A-204D and 206A-206D, that will actively utilize a service. For example, the pod 204A may utilize KSQL with data from the virtual private cloud 102. Thus, the pod 204A can be considered an operational pod. Moreover, the pod 204D may remain in an offline state, i.e., the pod 204D will not be utilizing any type of application instance. Here, the pod 204D can be considered "non-operational." Furthermore, the pods are part of the deployment plane. Thus, the pods that are operational can be considered the operational pods that the deployment plane has where the number of operational pods can correspond to the first number.

As an example of the method 300, referred to herein as "the illustration," during the operation 302, the virtual machines 110A and 110B can be provisioned to the cluster 104 as shown with reference to FIG. 1. In the illustration, an end user associated with the pods in the cluster 104 desires to use application instances of Apache Kafka™ at the pods 204A-204C and at the pods 206A and 206B. The end user wishes to use the pods 204A-204C, 206A, and 206B in conjunction with traffic received from AWS™ received via the virtual private cloud 102. Thus, the pods 204A-204C, 206A, and 206B can be in an online state, and can therefore be considered operational pods since the pods 204A-204C, 206A, and 206B will be implemented.

In the illustration, each of the pods 204A-204C, 206A, and 206B have a data throughput requirement of 25 Gbps for a total data throughput requirement of 125 Gbps. Furthermore, in the illustration, each of the virtual machines 110A and 110B are capable of supporting a data throughput requirement of 100 Gbps. Accordingly, during the operation 302, the virtual machines 110A and 110B can be provisioned to the cluster 104 in order to meet the data throughput requirement of 125 Gbps where a total data throughput of the combination of the virtual machines 110A and 110B is 200 Gbps. Moreover, the pods 204A-204C, 206A, and 206B are associated with the cluster 104, which is part of the deployment plane 107. Since there are five operational pods in the deployment plane 107, in the illustration, the first number of operational pods in the deployment plane 107 is five.

Returning to FIG. 3A and the method 300, after the virtual machines 110A and 110B are initially provisioned during the operation 302, the method 300 performs an operation 304.

During the operation 304, the method 300 monitors a status of the deployment plane. In examples, the status can reflect that the deployment plane now has a second number of pods that are operational, which can be different from the first number of operational pods. The number of pods that are operational can change such that the first number of operational pods differs from the second number of pods for a variety of reasons. To further illustrate, after provisioning, data throughput requirements for the end user may change, where data throughput requirements can increase or decrease. If data throughput requirements for the end user increase, the end user can add more operational pods to the deployment plane. If data throughput requirements for the end user decrease, the end user can remove operational pods from the deployment plane. Alternatively, after provisioning, the end user may still be in the process of configuring the pods that will be operational at the deployment plane where none of the pods are operational yet. Since no pods are operational yet at the deployment plane, there will be no data throughput requirements for the deployment plane such that virtual machines do not need to be provisioned for the deployment plane. Regardless of whether or not operational pods have been added to the deployment plane or removed from the deployment plane, in examples, a Kubernetes configured controller, such as the traffic controller 126, can listen to the count of the number of pods being used for each service during the operation 304.

After monitoring the status of the deployment plane during the operation 304, the method 300 performs an operation 306, where the first number of operational pods for which virtual machines were provisioned is compared to the second number of operational pods determined during the operation 304. In examples, based on the comparison, a determination can be made if the number of virtual machines provisioned to the deployment plane should be adjusted during an operation 308.

In some instances, while the number of operational pods in the deployment plane may change, the number of virtual machines provisioned to the deployment may not necessarily change. For example, a single virtual machine can be capable of supporting a data throughput of 100 Gbps and a first number of operational pods in a deployment plane, which is four, have a data throughput requirement of 25 Gbps for a total throughput requirement of 100 Gbps. If, during the operation 304, the status reflects three pods are operational in the deployment plane, the data throughput requirement drops to 75 Gbps. Here, since the single virtual machine is capable of providing a throughput of 75 Gbps, i.e., 75 Gbps is less than the 100 Gbps capability of the virtual machine, a determination can be made that the number of virtual machines to be provisioned to the deployment plane should not be adjusted during the operation 308.

As another example, still staying with the scenario where a single virtual machine can be capable of supporting a data throughput of 100 Gbps and a first number of operational pods in a deployment plane, which is four, have a data throughput requirement of 25 Gbps, during the operation 304, the status can reflect that five pods are operational in the deployment plane. Thus, the second number of operational pods in the deployment plane has increased from four to five. Moreover, the fifth operational pod has a data throughput requirement of 25 Gbps. Thus, provisioned virtual machines in the data plane should be able to support a data throughput of 125 Gbps. However, one virtual machine having a data throughput of 100 Gbps is assigned to the deployment plane. As such, a determination can be made that the number of virtual machines to be provisioned to the deployment plane should be adjusted, where a second virtual machine having a throughput of at least 25 Gbps is provisioned to the deployment plane now having a second number of five operational pods.

As still another example and staying with the scenario where a single virtual machine can be capable of supporting a data throughput of 100 Gbps and a first number of operational pods in a deployment plane, which is four, have a data throughput requirement of 25 Gbps, during the operation 304, the status reflects that no pods are operational in the deployment plane. This can occur when the end user is still preparing pods for deployment and has not yet begun deployment of the pods. Here, since there is no data throughput through the data plane having no operational pods, a determination can be made that the number of virtual machines to be provisioned to the deployment plane should be adjusted, where no virtual machines should be provisioned for the deployment plane since no pods are operational at the deployment plane.

Returning to the illustration, during the operation 304, the traffic controller 126 can listen to the count of operational pods in order to monitor the status of the deployment plane 107. During the operation 304, the traffic controller 126 determines, via listening to the count, that there are no operational pods in the cluster 104. In the illustration, the end user implementing the application instances of Apache Kafka™ at the pods 204A-204C, 206A, and 206B is configuring these pods for the implementation of the application instances of Apache Kafka™. Thus, none of the pods 204A-204C, 206A, and 206B are operational. In the illustration, the second number of operational pods in the deployment plane 107 is zero.

Staying with the illustration, in the operation 306, the traffic controller 126 compares the first number of operational pods, which is five, with the second number of operational pods, which is zero. Based on the comparison, the traffic controller 126 recognizes that virtual machines do not need to be provisioned to the deployment plane 107 and determines that the number of virtual machines provisioned to the deployment plane 107 should be adjusted during the operation 308.

Returning to FIG. 3A and the method 300, after the operation 308, the method 300 performs an operation 310, where the number of virtual machines can be adjusted based on the comparison between the first number of operational pods and the second number of operational pods. As discussed above, in some instances, the second number of operational pods can be greater than the first number of pods. In addition, when the greater number of operational pods requires additional virtual machines, such as in the scenario above where the total data throughput requirements increases from 100 Gbps to 125 Gbps and a single virtual machine has a data throughout capability of 100 Gbps, the number of virtual machines provisioned can be adjusted such that an additional virtual machine is provisioned to the deployment plane having the added operational pod.

Also as discussed above, in some instances, the second number of operational pods can be less than the first number of pods. When a fewer number of operational pods requires fewer virtual machines, such as in the scenario above where the total data throughput requirement decreases from 125 Gbps to 100 Gbps and a single virtual machine has a data throughout capability of 100 Gbps where two virtual machines are provisioned to the deployment plane, one of the virtual machines can be removed from the deployment plane. In particular, since one virtual machine is capable of providing a data throughput of 100 Gbps, the number of virtual machines provisioned to a deployment plane can be adjusted such that a single virtual machine can be provisioned to the deployment plane.

Returning to the illustration, as noted above, during the operation 308, the traffic controller 126 determined that the number of virtual machines provisioned to the deployment plane 107 should be adjusted. More specifically, the traffic controller 126 determined that none of the pods 204A-204C, 206A, and 206B are operational. Thus, the traffic controller 126 determined in the operation 308 that the number of virtual machines provisioned for the deployment plane 107 should be adjusted. During the operation 310, in the illustration, the traffic controller 126 can issue an instruction to the cloud virtual machine API 128 indicating that the virtual machine should be removed from being provisioned to the cluster 104. Therefore, during the operation 310, the virtual machine 110A will be removed such that the virtual machine 110A is no longer provisioned to the cluster 104.

Returning attention to FIG. 3A and the method 300, upon completion of the operation 310, the method 300 can perform an operation 312, where a status of the deployment plane is monitored. In examples, the status can reflect that the deployment plane now has a third number of pods that are operational, which can be different from the second number of operational pods. The number of pods that are operational can change such that the second number of operational pods differs from the third number of pods for a variety of reasons, as discussed above with reference to the operation 304.

After monitoring the status of the deployment plane during the operation 312, the method 300 performs an operation 314, where the second number of operational pods for which virtual machines were provisioned is compared to the third number of operational pods determined during the operation 312. In examples, based on the comparison, a determination can be made if the number of virtual machines provisioned to the deployment plane should be adjusted during an operation 316.

In some instances, while the number of operational pods in the deployment plane may change, the number of virtual machines provisioned to the deployment may not necessarily change. For example, a single virtual machine can be capable of supporting a data throughput of 100 Gbps and a second number of operational pods in a deployment plane can have a data throughput requirement of 25 Gbps for a total throughput requirement of 100 Gbps. If, during the operation 312, the status reflects three pods are operational in the deployment plane, the data throughput requirement drops to 75 Gbps. Here, since the single virtual machine is capable of providing a throughput of 75 Gbps, i.e., 75 Gbps is less than the 100 Gbps capability of the virtual machine, a determination can be made that the number of virtual machines to be provisioned to the deployment plane should not be adjusted during the operation 316.

As another example, still staying with the scenario where a single virtual machine can be capable of supporting a data throughput of 100 Gbps and a second number of operational pods in a deployment plane, which is four, have a data throughput requirement of 25 Gbps, during the operation 312, the status can reflect that five pods are operational in the deployment plane. Thus, the third number of operational pods in the deployment plane has increased from four to five. Additionally, the fifth operational pod has a data throughput requirement of 25 Gbps. Thus, provisioned virtual machines in the data plane should be able to support a data throughput of 125 Gbps. However, one virtual machine having a data throughput of 100 Gbps is assigned to the deployment plane. As such, a determination can be made that the number of virtual machines to be provisioned to the deployment plane should be adjusted, where a second virtual machine having a throughput of at least 25 Gbps is provisioned to the deployment plane now having a third number of five operational pods.

As still another example and staying with the scenario where a single virtual machine can be capable of supporting a data throughput of 100 Gbps and a second number of operational pods in a deployment plane, which is four, have a data throughput requirement of 25 Gbps, during the operation 312, the status reflects that no pods are operational in the deployment plane. This can occur when the end user is still preparing pods for deployment and has not yet begun deployment of the pods. Here, since there is no data throughput through the data plane having no operational pods, a determination can be made that the number of virtual machines to be provisioned to the deployment plane should be adjusted, where no virtual machines should be provisioned for the deployment plane since no pods are operational at the deployment plane.

Returning to the illustration, during the operation 312, the traffic controller 126 can listen to the count of operational pods in order to monitor the status of the deployment plane 107. During the operation 312, the traffic controller determines, via listening to the count, that the pods 204A-204C and 206A are operational pods in the cluster 104. In the illustration, the end user implementing the pods at the cluster 104 desires to run application instances of Apache Kafka™ at the pods 204A-204C and 206A and therefore makes the pods 204A-204C and 206A operational. Here, while listening for a count, the traffic controller 126 determines that the pods 204A-204C and 206A are operational. The pods 204A-204C and 206A can correspond to a third number of operational pods in the operation 314, which in the illustration is four.

Sticking with the illustration, in the operation 316, the traffic controller 126 compares the third number of operational pods, which is four, with the second number of operational pods, which is zero. Based on the comparison, since no virtual machines are provisioned to the deployment plane 107 (e.g., zero operational pods require zero virtual machines), the traffic controller 126 recognizes that virtual machines should be provisioned to the deployment plane 107 and determines that the number of virtual machines provisioned to the deployment plane 107 should be adjusted during the operation 316. More specifically, each of the pods 204A-204C and 206A are running application instances of Apache Kafka™ that require a data throughput of 25 Gbps for each of the pods 204A-204C and 206A. Accordingly, the deployment plane 107 has a total data throughput requirement of 100 Gbps.

Returning to FIG. 3B and the method 300, after the operation 316, the method 300 performs an operation 318, where the number of virtual machines can be adjusted based on the comparison between the second number of operational pods and the third number of operational pods. As discussed above, in some instances, the third number of operational pods can be greater than the second number of operational pods. Moreover, when the greater number of operational pods requires additional virtual machines, such as in the scenario above where the total data throughput requirements increase from 100 Gbps to 125 Gbps and a single virtual machine has a data throughput capability of 100 Gbps, the number of virtual machines provisioned can be adjusted such that an additional virtual machine is provisioned to the deployment plane having the added operational pod.

Also as discussed above, in some instances, the second number of operational pods can be less than the third number of pods. When a fewer number of operational pods requires fewer virtual machines, such as in the scenario above where the total data throughput requirement decreases from 125 Gbps to 100 Gbps and a single virtual machine has a data throughput capability of 100 Gbps where two virtual machines are provisioned to the deployment plane, one of the virtual machines can be removed from the deployment plane. In particular, since one virtual machine is capable of providing a data throughput of 100 Gbps, the number of virtual machines provisioned to a deployment plane can be adjusted such that a single virtual machine can be provisioned to the deployment plane.

Returning to the illustration, as noted above, during the operation 316, the traffic controller 126 determined that the number of virtual machines provisioned to the deployment plane 107 should be adjusted. More specifically, the traffic controller 126 determined that the pods 204A-204C and 206A are operational. Thus, the traffic controller 126 determined in the operation 316 that the number of virtual machines provisioned for the deployment plane 107 should be adjusted. In particular, each of the pods 204A-204C and 206A are running application instances of Apache Kafka™ and each require a data throughput of 25 Gbps for a total data throughput of 100 Gbps. In the illustration, each of the virtual machines 110A and 110B are capable of providing a total data throughput of 100 Gbps. Thus, during the operation 318, the number of virtual machines is adjusted based on the comparison between the second number of operational pods and the third number of operational pods from zero virtual machines to one virtual machine.

During the operation 318, in the illustration, the traffic controller 126 can issue an instruction to the cloud virtual machine API 128 indicating that the virtual machine 110A should be provisioned to the cluster 104. Therefore, during the operation 318, the virtual machine 110A will be provisioned to the cluster 104. After completion of the operation 318, the method 300 is complete.

Returning attention to the operation 308, which relates to determining if the number of virtual machines should be adjusted based on the comparison between the first number of operational pods and the second number of operational pods, if a determination is made that the number virtual machines should be adjusted, the method 300 performs the operation 310. However, if the method 300 determines that the number of virtual machines should not be adjusted during the operation 308, the method 300 performs the operation 312.

Furthermore, returning to attention to the operation 316, which relates to determining if the number of virtual machines should be adjusted based on the comparison between the second number of operational pods and the third number of operational pods, if a determination is made that the number virtual machines should not be adjusted during the operation 316, the method 300 is complete.

While the method 300 describes monitoring a status of a deployment plane twice during the operations 304 and 312, it should be noted that the status of the deployment plane could only be monitored once, i.e., the operations 312-318 could be eliminated such that the method 30 only performs the operations 302-310. Here, if a determination is made during the operation 308 that the number of virtual machines should not be completed, then the method 300 is complete.

Furthermore, the method 300 describes monitoring a status of a deployment plane twice during the operations 304 and 312, it should be noted that the status of the deployment plane could be monitored any number of times. In addition, examples envision that, instead of terminating after completion of the operation 318, the method 300 is continuous loop where the operations 302-318 or the operations 304-318 are continually performed.

Figure 2:
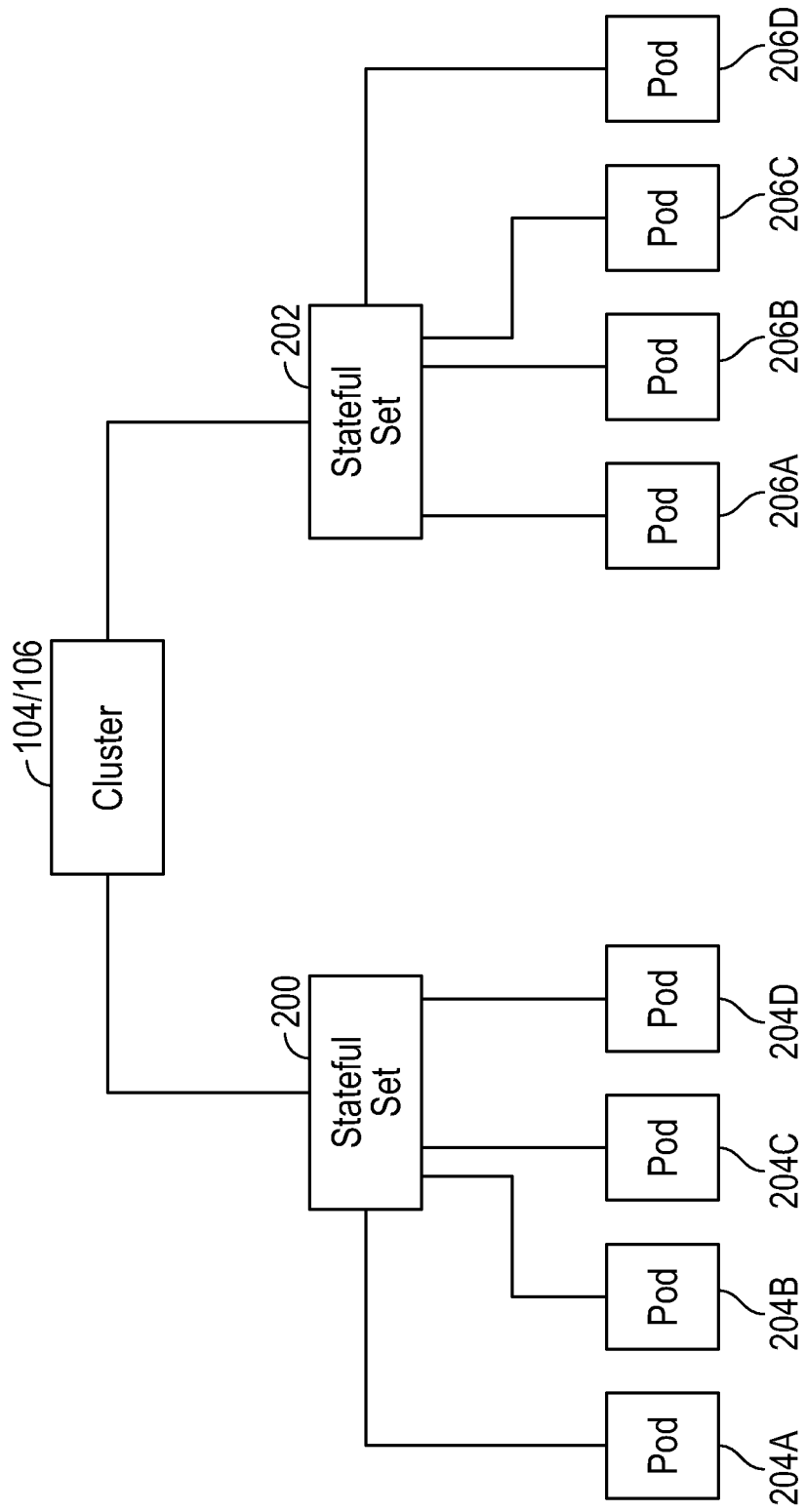
FIG. 2 is an architecture of a cluster in the deployment plane of FIG. 1, according to some examples.

Any of the machines, databases, or devices shown in FIGS. 1 and 2 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 4 and 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements of the computing environment 100 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-3B are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Described implementations of the subject matter can include one or more features, alone or in combination as illustrated below by way of example.

Example 1 is a method for dynamically adjusting a number of virtual machines in a data plane, the method comprising:

provisioning the number of virtual machines in the data plane, the number of virtual machines having a data plane proxy, the number of virtual machines providing data routing for a first number of operational pods in a deployment plane associated with the data plane;

monitoring a status of the deployment plane, the status reflecting the deployment plane has a second number of operational pods different from the first number of operational pods;

comparing the first number of operational pods to the second number of operational pods; and dynamically adjusting the number of virtual machines in the data plane based on a result of the comparison between the first number of operational pods and the second number of operation pods.

2. The method of example 1, wherein the deployment plane includes a traffic controller and the traffic controller is configured to monitor the status of the deployment plane and compare the first number of operational pods to the second number of operational pods.

3. The method of examples 1 and 2, wherein the traffic controller is configured to issue a virtual machine application programming interface (API) based on the comparison between the first number of operational pods and the second number of operation pods to a cloud-based virtual machine API.

4. The examples 1-3, wherein the second number of operational pods is less than the first number of operational pods and the virtual machine API reduces the number of the virtual machines in the data plane.

5. The method of examples 1-4, wherein the second number of operational pods is zero and the virtual machine API reduces the number of virtual machines in the data plane to zero.

6. The method of examples 1-5, wherein the second number of operational pods is greater than the first number of operational pods and the virtual machine API increases the number of the virtual machines in the data plane.

7. The method of examples 1-6, further comprising:
monitoring a second status of the deployment plane after dynamically adjusting the number of virtual machines in the data plane, the status reflecting the deployment plane has a third number of operational pods different from the second number of operation pods;
comparing the second number of operational pods to the third number of operational pods; and
dynamically adjusting the number of virtual machines in the data plane based on the comparison between the second number of operational pods and the third number of operational pods such that the number of virtual machines is adjusted a second time after the provisioning.

8. A system, comprising:
at least one processor; and
at least one memory including instructions that, when executed by the at least one processor, cause the at least one processor to perform operations comprising:
provisioning a number of virtual machines in a data plane, the number of virtual machines having a data plane proxy, the number of virtual machines providing data routing for a first number of operational pods in a deployment plane associated with the data plane;
monitoring a status of the deployment plane, the status reflecting the deployment plane has a second number of operational pods different from the first number of operational pods;
comparing the first number of operational pods to the second number of operational pods; and
dynamically adjusting the number of virtual machines in the data plane based on a result of the comparison between the first number of operational pods and the second number of operation pods.

9. The system of example 8, wherein the deployment plane includes a traffic controller and the traffic controller is configured to monitor the status of the deployment plane and compare the first number of operational pods to the second number of operational pods.

10. The system of examples 8 and 9, wherein the traffic controller is configured to issue a virtual machine application programming interface (API) based on the comparison between the first number of operational pods and the second number of operation pods to a cloud-based virtual machine API.

11. The system of examples 8-10, wherein the second number of operational pods is less than the first number of operational pods and the virtual machine API reduces the number of the virtual machines in the data plane.

12. The system of examples 8-11, wherein the second number of operational pods is greater than the first number of operational pods and the virtual machine API increases the number of the virtual machines in the data plane.

13. The system of examples 8-12, wherein the instructions further cause the device to perform operations comprising:
monitoring a second status of the deployment plane after dynamically adjusting the number of virtual machines in the data plane, the status reflecting the deployment plane has a third number of operational pods different from the second number of operation pods;
comparing the second number of operational pods to the third number of operational pods; and
dynamically adjusting the number of virtual machines in the data plane based on the comparison between the second number of operational pods and the third number of operational pods such that the number of virtual machines is adjusted a second time after the provisioning.

14. A non-transitory machine-readable medium having instructions embodied thereon, the instructions executable by a processor of a machine to perform operations comprising:
provisioning a number of virtual machines in a data plane, the number of virtual machines having a data plane proxy, the number of virtual machines providing data routing for a first number of operational pods in a deployment plane associated with the data plane;
monitoring a status of the deployment plane, the status reflecting the deployment plane has a second number of operational pods different from the first number of operational pods;
comparing the first number of operational pods to the second number of operational pods; and
dynamically adjusting the number of virtual machines in the data plane based on a result of the comparison between the first number of operational pods and the second number of operation pods.

15. The non-transitory machine-readable medium of example 14, wherein the deployment plane includes a traffic controller and the traffic controller is configured to monitor the status of the deployment plane and compare the first number of operational pods to the second number of operational pods.

16. The non-transitory machine-readable medium of examples 14 and 15, wherein the traffic controller is configured to issue a virtual machine application programming interface (API) based on the comparison between the first number of operational pods and the second number of operation pods to a cloud-based virtual machine API.

17. The non-transitory machine-readable medium of examples 14-16, wherein the second number of operational pods is less than the first number of operational pods and the virtual machine API reduces the number of the virtual machines in the data plane.

18. The non-transitory machine-readable examples 14-17, wherein the second number of operational pods is zero and the virtual machine API reduces the number of virtual machines in the data plane to zero.

19. The non-transitory machine-readable medium of examples 14-18, wherein the second number of operational pods is greater than the first number of operational pods and the virtual machine API increases the number of the virtual machines in the data plane.

20. The non-transitory machine-readable medium of examples 14-19, wherein the operations further comprise:
monitoring a second status of the deployment plane after dynamically adjusting the number of virtual machines in the data plane, the status reflecting the deployment plane has a third number of operational pods different from the second number of operation pods;
comparing the second number of operational pods to the third number of operational pods; and
dynamically adjusting the number of virtual machines in the data plane based on the comparison between the second number of operational pods and the third number of operational pods such that the number of virtual machines is adjusted a second time after the provisioning . . . .

Figure 4:
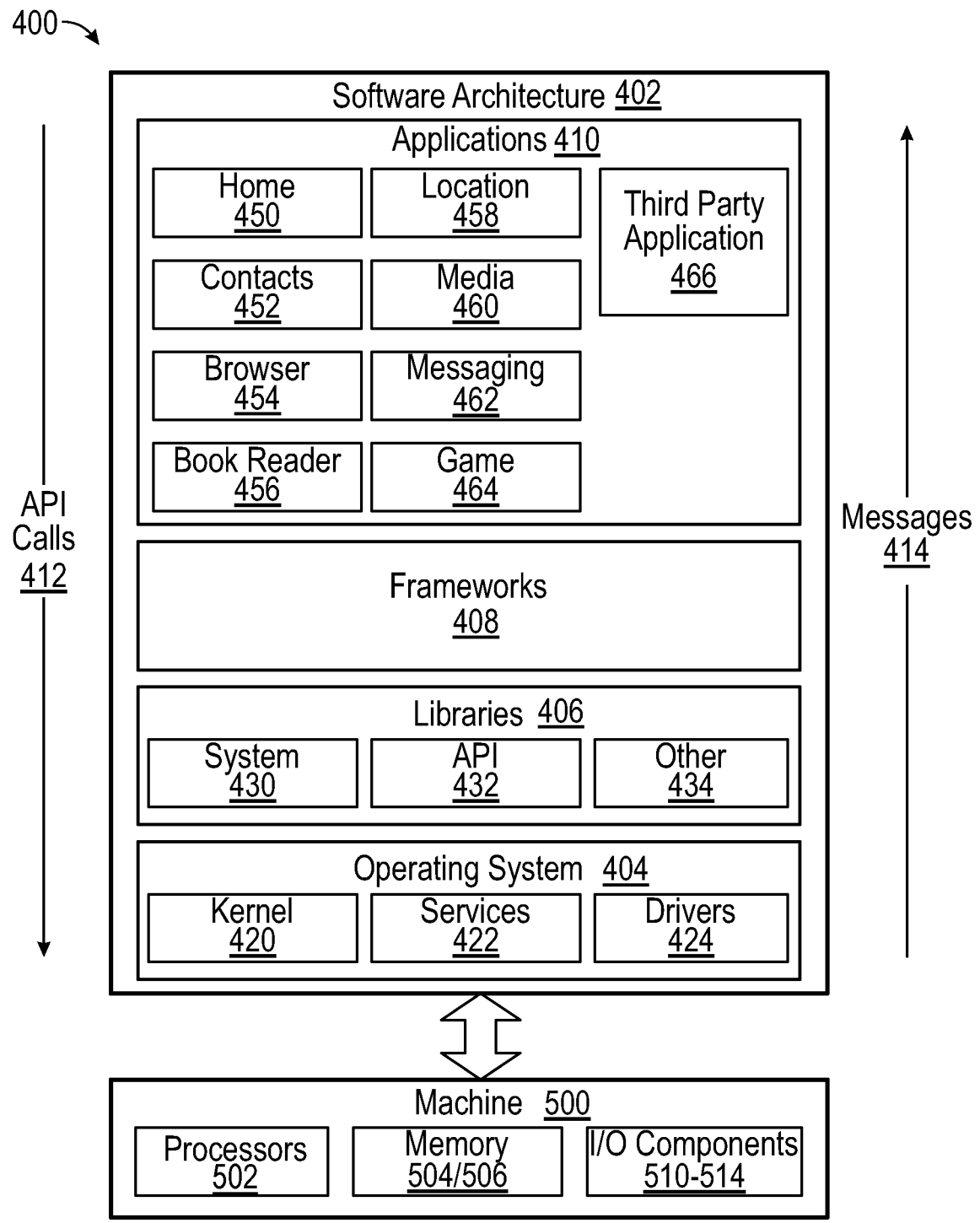
FIG. 4 is a block diagram illustrating architecture of software used to implement displaying an interactive user interface, according to some examples.

FIG. 4 is a block diagram 400 illustrating a software architecture 402, which may be installed on any one or more of the devices described above. FIG. 4 is merely a non-limiting example of a software architecture, and it will be appreciated that many other architectures may be implemented to facilitate the functionality described herein. The software architecture 402 may be implemented by hardware such as a machine 500 of FIG. 5 that includes a processor 502, memory 504 and 506, and I/O components 510-514. In this example, the software architecture 402 may be conceptualized as a stack of layers where each layer may provide a particular functionality. For example, the software architecture 402 includes layers such as an operating system 404, libraries 406, frameworks 408, and applications 410. Operationally, the applications 410 invoke application programming interface (API) calls 412 through the software stack and receive messages 414 in response to the API calls 412, according to some implementations.

In various implementations, the operating system 404 manages hardware resources and provides common services. The operating system 404 includes, for example, a kernel 420, services 422, and drivers 424. The kernel 420 acts as an abstraction layer between the hardware and the other software layers in some implementations. For example, the kernel 420 provides memory management, processor management (e.g., scheduling), component management, networking, and security settings, among other functionality. The services 422 may provide other common services for the other software layers. The drivers 424 may be responsible for controlling or interfacing with the underlying hardware. For instance, the drivers 424 may include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 406 provide a low-level common infrastructure that may be utilized by the applications 410. The libraries 406 may include system libraries 430 (e.g., C standard library) that may provide functions such as memory allocation functions, string manipulation functions, mathematic functions, and the like. In addition, the libraries 406 may include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 may also include a wide variety of other libraries 434 to provide many other APIs to the applications 410.

The frameworks 408 provide a high-level common infrastructure that may be utilized by the applications 410, according to some implementations. For example, the frameworks 408 provide various graphic user interface (GUI) functions, high-level resource management, high-level location services, and so forth. The frameworks 408 may provide a broad spectrum of other APIs that may be utilized by the applications 410, some of which may be specific to a particular operating system or platform.

In an example, the applications 410 include a home application 450, a contacts application 452, a browser application 454, a book reader application 456, a location application 458, a media application 460, a messaging application 462, a game application 464, and a broad assortment of other applications such as a third-party application 466. According to some examples, the applications 410 are programs that execute functions defined in the programs. Various programming languages may be employed to create one or more of the applications 410, structured in a variety of manners, such as object-orientated programming languages (e.g., Objective-C, Java, or C++) or procedural programming languages (e.g., C or assembly language). In a specific example, the third-party application 466 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 466 may invoke the API calls 412 provided by the mobile operating system (e.g., the operating system 404) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 5:
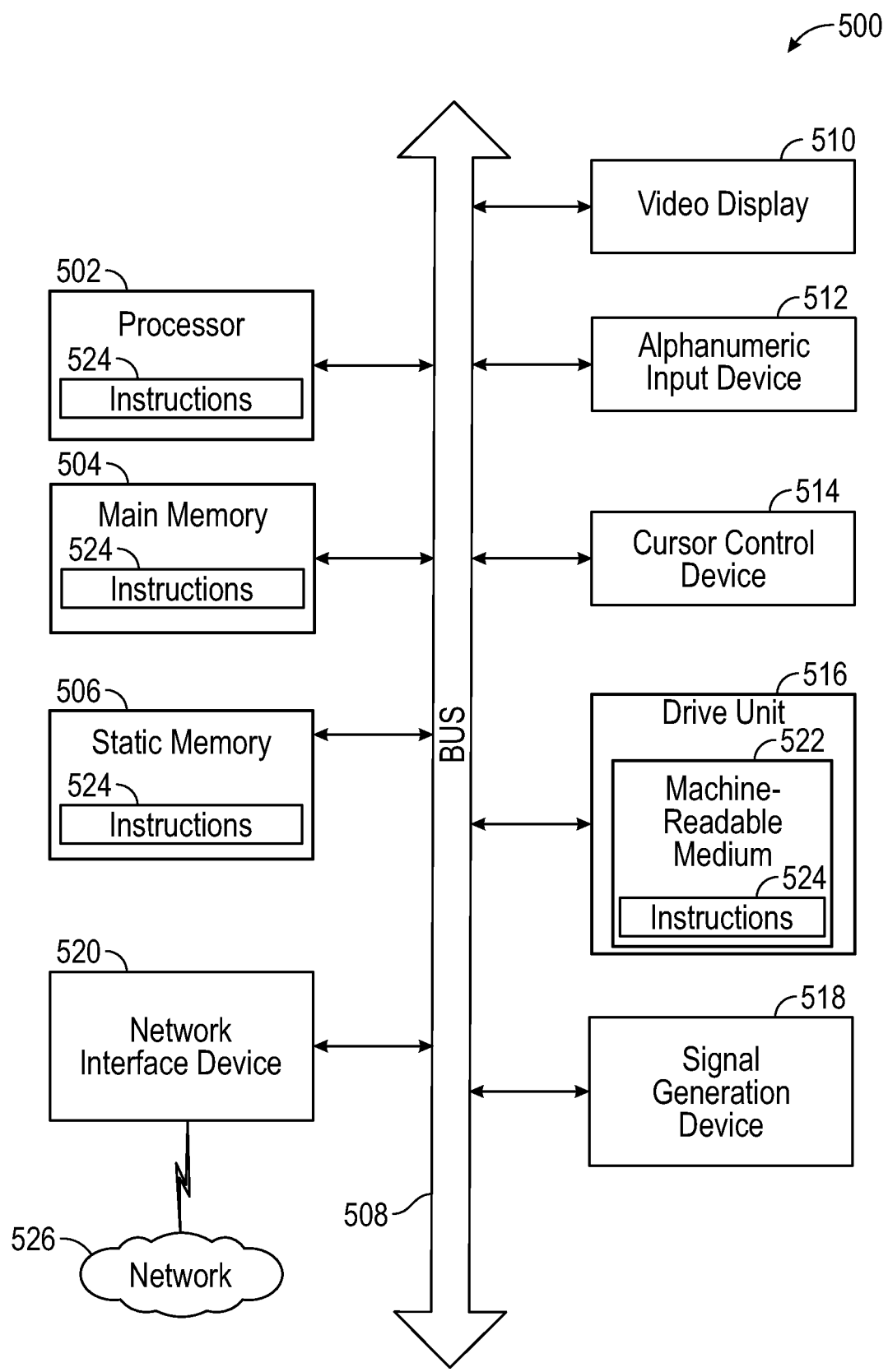
FIG. 5 shows a machine as an example computer system with instructions to cause the machine to implement displaying an interactive user interface, according to some examples.

FIG. 5 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 500, which can be a computer system, includes the processor 502 (e.g., a central processing unit (CPU), a graphics processing unit (GPU) or both), a main memory 504 and a static memory 506, which communicate with each other via a bus 508. The machine 500 may further include a video display unit 510 (e.g., a liquid crystal display (LCD) or a cathode ray tube (CRT)). The machine 500 also includes an alphanumeric input device 512 (e.g., a keyboard), a user interface (UI) navigation device (cursor control device) 514 (e.g., a mouse), a disk drive unit 516, a signal generation device 518 (e.g., a speaker) and a network interface device 520.

The drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the machine 500, the main memory 504 and the processor 502 also constituting machine-readable media. Instructions 524 may also reside within the static memory 506.

While the machine-readable medium 522 is shown in an example to be a single medium, the term "machine-readable medium" may include a single medium or multiple media (e.g., a centralized or distributed database, and/or associated caches and servers) that store the one or more instructions or data instructions 524. The term "machine-readable medium" shall also be taken to include any tangible medium that is capable of storing, encoding or carrying instructions 524 for execution by the machine and that cause the machine to perform any one or more of the methodologies of the present invention, or that is capable of storing, encoding or carrying data structures utilized by or associated with such instructions 524. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks). The term "transmission medium" shall be taken to include any intangible medium that is capable of storing, encoding or carrying instructions 524 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Executable Instructions and Machine Storage Medium

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of network, such as the network-based system may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method of dynamically adjusting a number of virtual machines in a data plane, the method comprising:
   provisioning the number of virtual machines in the data plane, the number of virtual machines having a data plane proxy, the number of virtual machines providing data routing for a first number of operational pods in a deployment plane associated with the data plane;
   monitoring a status of the deployment plane, the status reflecting that a number of the operational pods operating in the deployment plane has changed from the first number to a second number of operational pods, the second number being different from the first number of operational pods;
   comparing the first number of operational pods to the second number of operational pods to determine a value of the change in the number of the operational pods operating in the deployment plane; and
   dynamically adjusting the number of virtual machines in the data plane based on the value of the change in the number of operational pods operating in the deployment plane where the number of virtual machines in the data plane changes with the value of the number operational pods operating in the deployment plane such that when the number of the operational pods decreases, the number of virtual machines in the data plane is decreased and when the number of the operational pods increases, the number of virtual machines in the data plane is increased.

2. The method of claim 1, wherein the deployment plane includes a traffic controller and the traffic controller is configured to monitor the status of the deployment plane and compare the first number of operational pods to the second number of operational pods.

3. The method of claim 2, wherein the traffic controller is configured to issue a virtual machine application programming interface (API) based on the comparison between the first number of operational pods and the second number of operation pods to a cloud-based virtual machine API.

4. The method of claim 3, wherein the second number of operational pods is zero and the virtual machine API reduces the number of virtual machines in the data plane to zero.

5. The method of claim 1, further comprising:
   monitoring a second status of the deployment plane after dynamically adjusting the number of virtual machines in the data plane, the status reflecting the deployment plane has a third number of operational pods different from the second number of operation pods;
   comparing the second number of operational pods to the third number of operational pods; and
   dynamically adjusting the number of virtual machines in the data plane based on the comparison between the second number of operational pods and the third number of operational pods such that the number of virtual machines is adjusted a second time after the provisioning.

6. A system, comprising:
   at least one processor; and
   at least one memory including instructions that, when executed by the at least one processor, cause the at least one processor to perform operations comprising:
      provisioning a number of virtual machines in a data plane, the number of virtual machines having a data plane proxy, the number of virtual machines providing data routing for a first number of operational pods in a deployment plane associated with the data plane;
      monitoring a status of the deployment plane, the status reflecting that a number of the operational pods operating in the deployment plane has changed from the first number to a second number of operational pods, the second number being different from the first number of operational pods;
      comparing the first number of operational pods to the second number of operational pods to determine a value of the change in the number of the operational pods operating in the deployment plane; and
      dynamically adjusting the number of virtual machines in the data plane based on the value of the change in the number of operational pods operating in the deployment plane where the number of virtual machines in the data plane changes with the value of the number operational pods operating in the deployment plane such that when the number of the operational pods decreases, the number of virtual machines in the data plane is decreased and when the number of the operational pods increases, the number of virtual machines in the data plane is increased.

7. The system of claim 6, wherein the deployment plane includes a traffic controller and the traffic controller is configured to monitor the status of the deployment plane and compare the first number of operational pods to the second number of operational pods.

8. The system of claim 7, wherein the traffic controller is configured to issue a virtual machine application programming interface (API) based on the comparison between the first number of operational pods and the second number of operation pods to a cloud-based virtual machine API.

9. The system of claim 6, wherein the instructions further cause the device to perform operations comprising:

monitoring a second status of the deployment plane after dynamically adjusting the number of virtual machines in the data plane, the status reflecting the deployment plane has a third number of operational pods different from the second number of operation pods;

comparing the second number of operational pods to the third number of operational pods; and dynamically adjusting the number of virtual machines in the data plane based on the comparison between the second number of operational pods and the third number of operational pods such that the number of virtual machines is adjusted a second time after the provisioning.

10. A non-transitory machine-readable medium having instructions embodied thereon, the instructions executable by a processor of a machine to perform operations comprising:

provisioning a number of virtual machines in a data plane, the number of virtual machines having a data plane proxy, the number of virtual machines providing data routing for a first number of operational pods in a deployment plane associated with the data plane;

monitoring a status of the deployment plane, the status reflecting that a number of the operational pods operating in the deployment plane has changed from the first number to a second number of operational pods, the second number being different from the first number of operational pods;

comparing the first number of operational pods to the second number of operational pods to determine a value of the change in the number of the operational pods operating in the deployment plane; and dynamically adjusting the number of virtual machines in the data plane based on the value of the change in the number of operational pods operating in the deployment plane where the number of virtual machines in the data plane changes with the value of the number operational pods operating in the deployment plane such that when the number of the operational pods decreases, the number of virtual machines in the data plane is decreased and when the number of the operational pods increases, the number of virtual machines in the data plane is increased.

11. The non-transitory machine-readable medium of claim 10, wherein the deployment plane includes a traffic controller and the traffic controller is configured to monitor the status of the deployment plane and compare the first number of operational pods to the second number of operational pods.

12. The non-transitory machine-readable medium of claim 11, wherein the traffic controller is configured to issue a virtual machine application programming interface (API) based on the comparison between the first number of operational pods and the second number of operation pods to a cloud-based virtual machine API.

13. The non-transitory machine-readable medium of claim 12, wherein the second number of operational pods is zero and the virtual machine API reduces the number of virtual machines in the data plane to zero.

14. The non-transitory machine-readable medium of claim 10, wherein the operations further comprise:

monitoring a second status of the deployment plane after dynamically adjusting the number of virtual machines in the data plane, the status reflecting the deployment plane has a third number of operational pods different from the second number of operation pods;

comparing the second number of operational pods to the third number of operational pods; and dynamically adjusting the number of virtual machines in the data plane based on the comparison between the second number of operational pods and the third number of operational pods such that the number of virtual machines is adjusted a second time after the provisioning.

* * * * *